(12) United States Patent
Van Den Goor (10) Patent No.: US 6,681,917 B2
(45) Date of Patent: Jan. 27, 2004

(54) METHOD AND DEVICE FOR CONVEYING OBJECTS

(75) Inventor: Jacobus Marie Van Den Goor, Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 09/768,620

(22) Filed: Jan. 25, 2001

(65) Prior Publication Data

US 2001/0023813 A1 Sep. 27, 2001

(30) Foreign Application Priority Data

Jan. 25, 2000 (NL) .............................................. 1014170

(51) Int. Cl.$^7$ .............................................. B65G 47/10
(52) U.S. Cl. ................. 198/370.04; 198/465.1
(58) Field of Search ....................... 198/370.03, 370.04, 198/395, 401, 414, 465.1

(56) References Cited

U.S. PATENT DOCUMENTS 4,938,334 A * 7/1990 McGinn ..................... 198/414
5,052,541 A    10/1991 James et al.
5,143,198 A * 9/1992 Hale et al. .................. 198/414
5,301,790 A * 4/1994 Prydtz et al. ............. 198/465.1
6,308,818 B1 * 10/2001 Bonora et al. .............. 198/414

FOREIGN PATENT DOCUMENTS

EP          0 456 297      11/1991
WO          WO 81/01999    7/1981

* cited by examiner

Primary Examiner—Joseph E. Valenza
(74) Attorney, Agent, or Firm—Oblon, Spivak, McClelland, Maier & Neustadt, P.C.

(57) ABSTRACT

The invention relates to a method for operating a device and to a device for conveying loose objects from a supply station to a delivery station, wherein a conveyor is used by means of which trays containing objects can be moved. The conveyor includes at least one carrier for receiving said trays, which carrier can be moved in an intended direction of movement with the aid of driving means and which can be selectively pivoted about a pivot axis at at least one desired location. The object is either removed from the tray by pivoting the carrier about the respective pivot axis, whereby the object slides off the tray in a first direction, or the tray and the object are jointly removed from the carrier by moving the tray and the object in a second direction transversely to said first direction.

15 Claims, 9 Drawing Sheets

METHOD AND DEVICE FOR CONVEYING OBJECTS

The invention relates to a method for operating a device for conveying objects from a supply station to a delivery station, wherein a conveyor is used by means of which trays containing loose objects can be moved, wherein said conveyor includes at least one carrier for receiving said trays, which carrier can be moved in an intended direction of movement with the aid of driving means and which can be selectively pivoted about a pivot axis at at least one desired location.

A method of this kind can be derived from U.S. Pat. No. 5,301,790.

According to this prior art method a tray is placed on a carrier, always in the same position, and the object is removed from the carrier, either by itself or together with the tray, by pivoting the carrier about the pivot axis that extends in the direction of movement of the carrier.

In particular when removing a tray containing an object there is a considerable risk that the object will slide off the tray when the carrier is being pivoted and land beside the tray.

According to the invention either the object is removed from the tray by pivoting the carrier about the respective pivot axis, whereby the object slides off the tray in a first direction, or the tray and the object are jointly removed from the carrier by moving the tray containing the object in a second direction, which includes an angle with said first direction.

When this method is used, effective use is made of the fact that a tray is usually provided at two opposite ends thereof with end walls or the like stop means extending above the bottom of the tray, which prevent an object from sliding off the tray when the tray containing the object is removed from the carrier in a direction substantially perpendicularly to the ends of the tray provided with upright end walls or the like stop means.

The invention furthermore relates to a device for conveying products from a supply station to a delivery station, which device includes a conveyor by means of which trays containing objects can be moved, wherein said conveyor includes at least one carrier for receiving trays containing loose objects, which carrier can be moved in an intended direction of movement by driving means and which can be selectively pivoted about a pivot axis at at least one desired location, whilst the device furthermore includes a supply conveyor, which is fitted with means for turning the tray about an imaginary upwardly extending pivot.

According to the invention the supply conveyor is constructed in such a manner that the tray can be selectively supplied to the carrier in one of two positions turned through an angle of 9° with respect to each other.

By using such a device it is possible in a simple manner to place the tray on the carrier in a first position thereof, which position is especially suitable for removing the object from the tray upon pivoting of the carrier about the pivot axis, whilst another position of the carrier is especially suitable for removing the tray from the carrier together with the object by pivoting the carrier about the pivot axis.

Another aspect of the invention relates to a conveyor by means of which products, such as trays, on which objects may or may not be present, and/or loose objects can be moved, wherein said conveyor includes at least one carrier for receiving products, which is bounded by two opposed sides and two ends, which carrier can be moved in an intended direction of movement by driving means and which can be selectively pivoted at at least one desired location about a pivot axis that extends at least substantially in said direction of movement and substantially parallel to the sides of the carrier.

When a conveyor of this kind is used, the product present on a carrier will slide off the carrier over one of the sides thereof upon pivoting of the carrier.

According to the invention the carrier can be adjusted to a position in which one end of the carrier is positioned higher than the other end.

By using this construction a product that is present on the carrier can also slide off the carrier via one end thereof. This is in particular efficient when the device is used for moving trays containing objects, wherein either the object is to be removed from the tray whilst the tray remains present on the carrier, or wherein the tray is to be removed from the carrier together with the object.

The invention will now be explained in more detail by means of a few possible embodiments of the device according to the invention as illustrated in the accompanying figures.

Figures 1, 2:
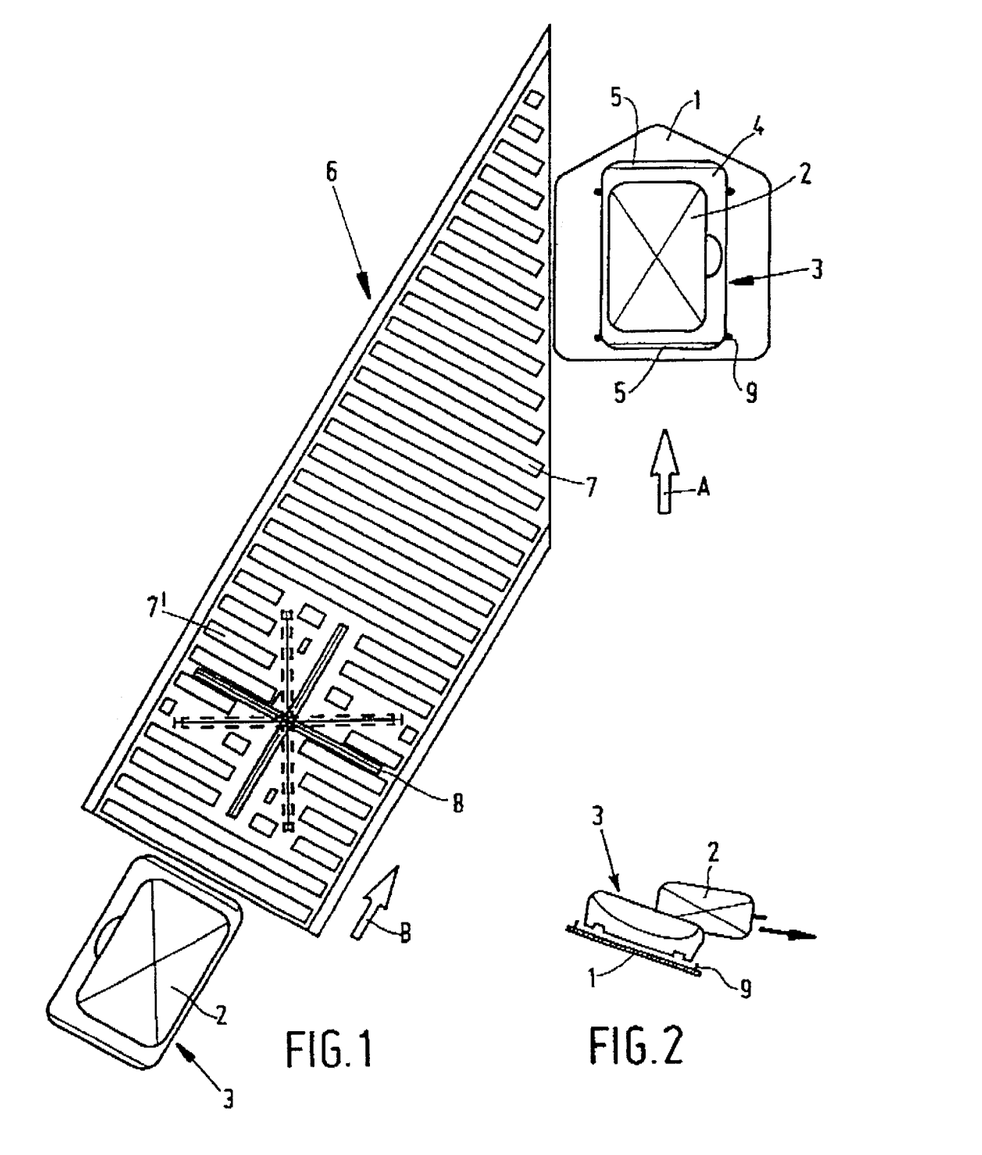
FIG. 1 is a schematic top plan view of a part of a device according to the invention.
FIG. 2 schematically shows a pivoted carrier supporting a tray during the removal of an object from the tray.

The device that is schematically shown in FIG. 1 comprises a conveyor, which includes one or more disc-shaped carriers 1, which are movable in the direction indicated by arrow A during operation and which are supported by linked-together trolleys (not shown). The disc-shaped carriers can thereby be pivoted with respect to the trolleys about pivot axes extending in the intended direction of movement indicated by arrow A. The disc-shaped carriers 1 are used for receiving products at a supply station and delivering said products at a desired delivery station. The device may comprise one or more supply stations and one or more delivery stations.

The construction of devices of this kind is generally known, for example from European patent no. 0 456 297 and from U.S. Pat. No. 5,301,790, so that it will not be necessary to discuss the construction of such a device in great detail herein.

Although the device can be used for conveying any type of product, such as loose objects, the device is in particular conceived for conveying trays 3, on which objects 2 may or may not be present. Such trays 3 generally include a bottom 4, which may or may not be slightly curved, on which the objects 2 are supported, and two upright end walls 5 disposed at the ends of the tray or other stop means projecting above the bottom 4 of the tray, which prevent an object 2 from sliding off the tray in any way other than over one of the sides of the tray extending between the upright walls 5 or the like stop means.

A supply conveyor 6, in the illustrated embodiment consisting of a roller conveyor including a plurality of rollers 7, by means of which a tray 3 can be moved in the direction indicated by arrow B to the conveyor comprising the carriers 1, is used for supplying a tray 3 containing an object 2 at a supply station. As is illustrated in the left-hand bottom corner of FIG. 1, the longitudinal axis of a tray 3 that is supplied, that is, the axis extending perpendicularly to the end walls 5 of the tray 3, initially extends parallel to the direction of movement according to arrow B.

The supply conveyor furthermore includes a rotatable cross shaped member 8, which comprises two arms extending at right angles to each other.

Figures 3, 4:
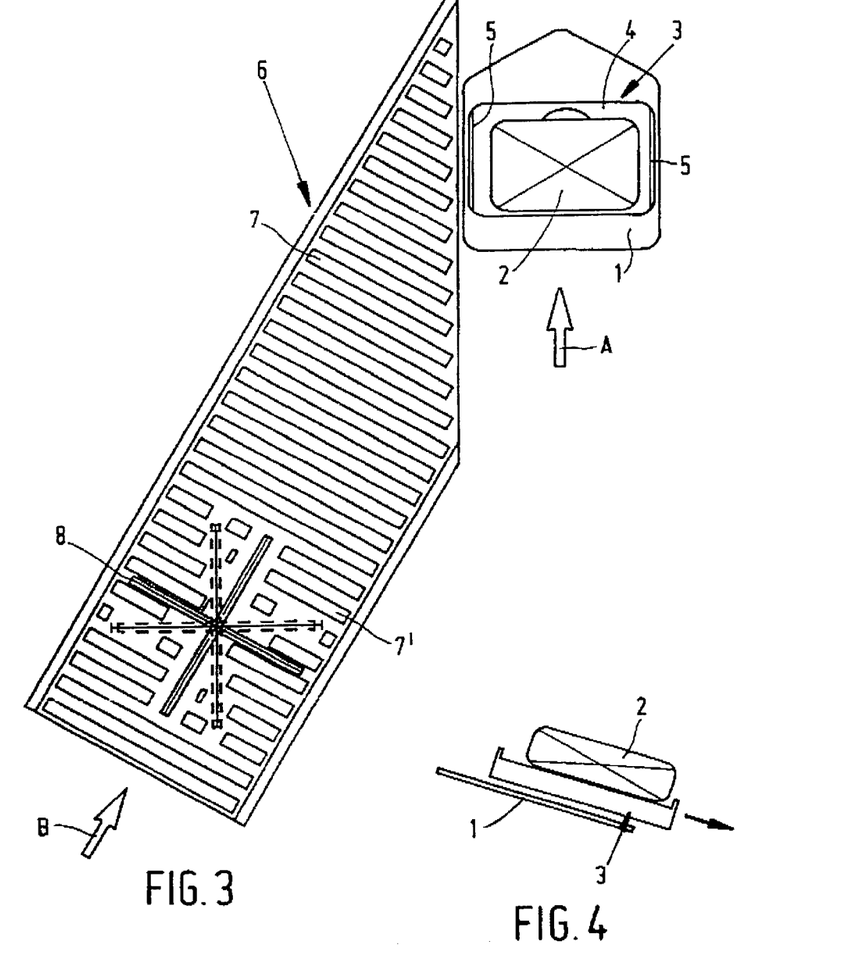
FIG. 3 is a view corresponding to FIG. 1, wherein a tray containing an object has been supplied to a carrier in another position.
FIG. 4 is a view corresponding to FIG. 2, wherein a tray containing an object is removed from the carrier.

Rotatable cross shaped member 8 can be moved up and down with the aid of driving means (not shown), and it can be selectively turned in clockwise or anticlockwise direction from the position illustrated in full lines in FIGS. 1 and 3 to the position illustrated in dotted lines in FIGS. 1 and 3. As furthermore appears from FIGS. 1 and 3, the supply conveyor includes shorter driving rollers 7' near the rotatable cross shaped member 8, such that the arms of the rotatable cross shaped member 8 can be moved up and down in the various positions between rollers 7', between a position in which rotatable cross shaped member 8 is positioned under the tops of rollers 7, 7', and a position in which the upper side of the rotatable cross shaped member 8 projects above rollers 7, 7'. When a tray 3 being supplied reaches a position above rotatable cross shaped member 8, rollers 7, 7' will be stopped, the rotatable cross shaped member 8 will be moved up and be turned in anticlockwise direction in order to move the tray to a position parallel to the position of the tray 3 supported on carrier 1 as illustrated in FIG. 1. Then the rotable cross shaped member 8 can be moved down and the rollers 7, 7' can be driven again as soon as tray 3 is supported on said rollers. Thus the tray 3 containing an object 2 can be supplied and be placed on a carrier by means of the supply conveyor 6, in such a manner that, as is shown in FIG. 1, the open sides of the tray 3 extend parallel to the intended direction of movement as indicated by arrow A, and the end walls 5 of the tray extend perpendicularly to the intended direction of movement as indicated by arrow A. In the meantime the rotatable cross shaped member 8 will be returned to the position illustrated in full lines in FIG. 1.

As is shown in FIG. 2, the object 2 present on tray 3 can now be removed from the tray at an intended delivery station by pivoting the carrier 1 about the pivot axis extending in the direction of movement indicated by arrow A. The tray is thereby retained on carrier 1 by means of stop members 9 in a manner which is known per se. If desired, the empty tray 3 can be removed from carrier 1 at a further delivery station by pivoting the carrier 1 about the pivot axis, whereby the locking member(s) 9 in question will have been moved out of the path of movement of the tray 3 with respect to carrier 1.

It is also possible, however, to place a tray 3 supplied by means of supply conveyor 6 on carrier 1 in a position in which it is turned through 90° in relation to the position of a tray 3 on carrier 1 that is shown in FIG. 1. To this end a tray 3 being supplied is lifted by means of rotatable cross shaped member 8 once tray 3 has arrived above rotatable cross shaped member 8 and the drive of rollers 7, 7" has been stopped, after which it is turned in clockwise direction along with rotatable cross shaped member 8 and placed back onto rollers 7, 7' again by lowering rotatable cross shaped member 8. Following that, tray 3 can be moved further ahead by activating the drive of rollers 7, 7' again, and be placed onto the respective carrier 1 in the position that is shown in FIG. 3.

Now the tray 3 and the object 2 present therein can move off the carrier 1 at a desired delivery station upon pivoting of the carrier 1, as is shown in FIG. 4. The upright side wall 5 effectively prevents object 2 from sliding off tray 3 in an undesirable manner.

As noted above, rotatable cross shaped member 8 will be returned to the starting position illustrated in full lines after a tray 3 has been turned in clockwise or anticlockwise direction.

Only in those cases wherein the angle between the longitudinal axis of the supply conveyor 6 and the longitudinal axis of the conveyor comprising said carriers 1 at the location of the junction is 45° is it not necessary to return the rotatable cross shaped member 8 to the starting position, since the rotatable cross shaped member will be turned through an angle of 45° each time a tray 3 is to be turned.

Of course many ways are conceivable for correctly positioning the tray 3 near supply conveyor 6 so as to place the tray 3 onto carrier 1 either in the position illustrated in FIG. 1 or in the position illustrated in FIG. 3.

Figure 5:
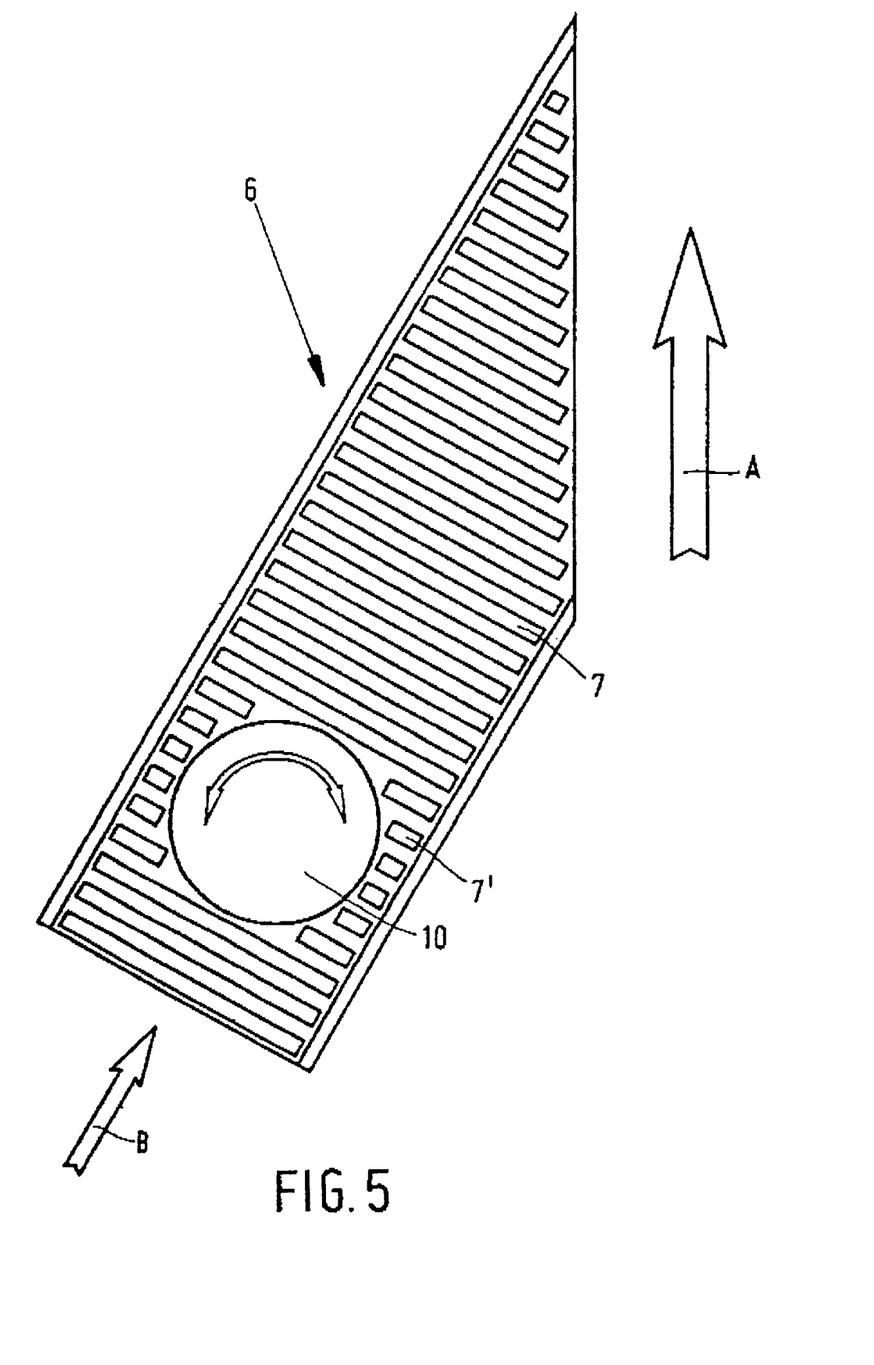
FIGS. 5–14 show various embodiments of means for moving a tray to a desired position.

Thus FIG. 5 shows an embodiment wherein the supply conveyor 6 includes a turntable 10 which is capable of upward and downward movement and which is rotatable about an upwardly extending axis of rotation. When this turntable is used, the turntable can be rotated in the same direction at all times for placing a tray in a desired position, so that generally a simpler driving mechanism and a faster operation can be obtained in comparison with the embodiment of FIGS. 1–4. It will also be conceivable, however, to use a turntable which can be turned forward and backward.

Figure 6:
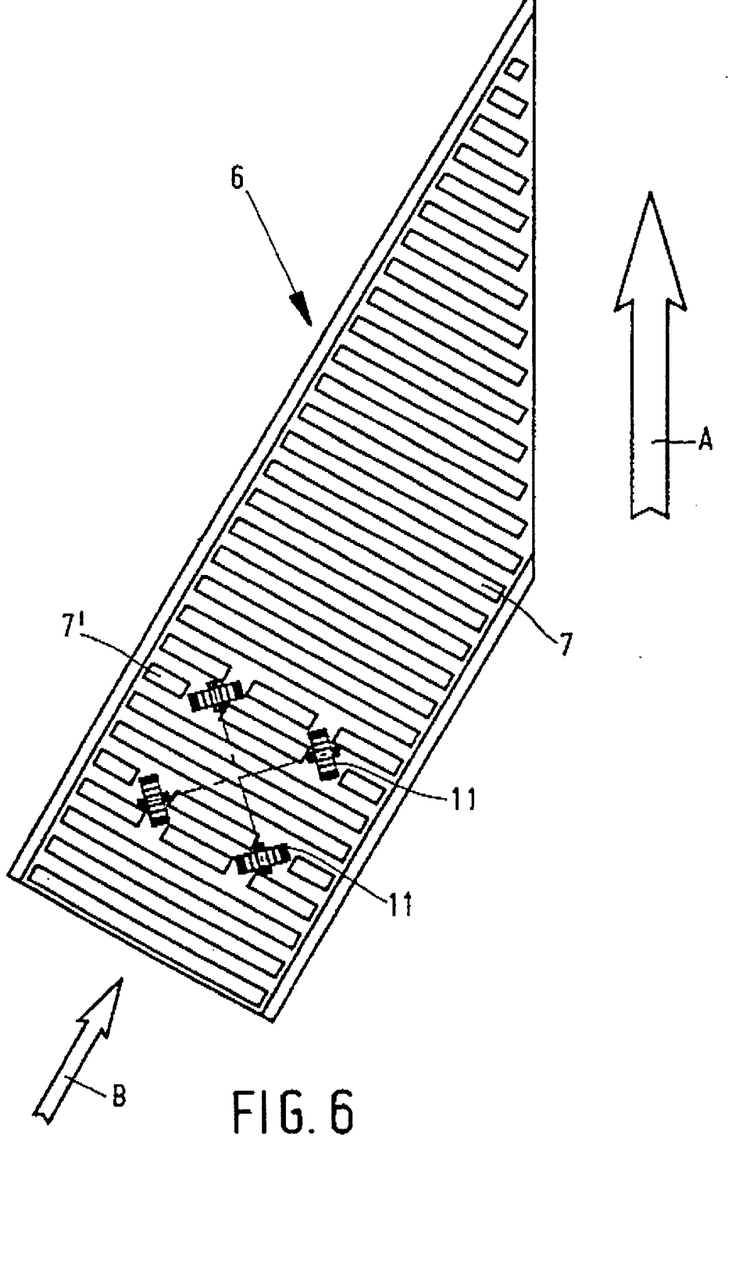

In the embodiment according to FIG. 6 the supply conveyor 6 includes four rollers or wheels 11, whose centres are disposed in the corner points of a square in the illustrated embodiment, seen from above on the supply conveyor 6. Also the drivable rollers or wheels 11 are capable of upward and downward movement between a position in which they are disposed at a lower level than the uppermost points of rollers 7, 7', and a position in which they project above rollers 7. When a tray has been brought to a standstill above wheels 11, the tray can be lifted by raising the wheels 11 and subsequently be turned to a desired position by driving the wheels 11, after which the wheels can be lowered again and the tray can be moved further ahead by means of rollers 7, 7'.

Although four rollers or wheels 11 are shown in FIG. 6, it will be understood that it is also possible to use more wheels or fewer wheels for turning a tray.

Figures 7, 8, 9:
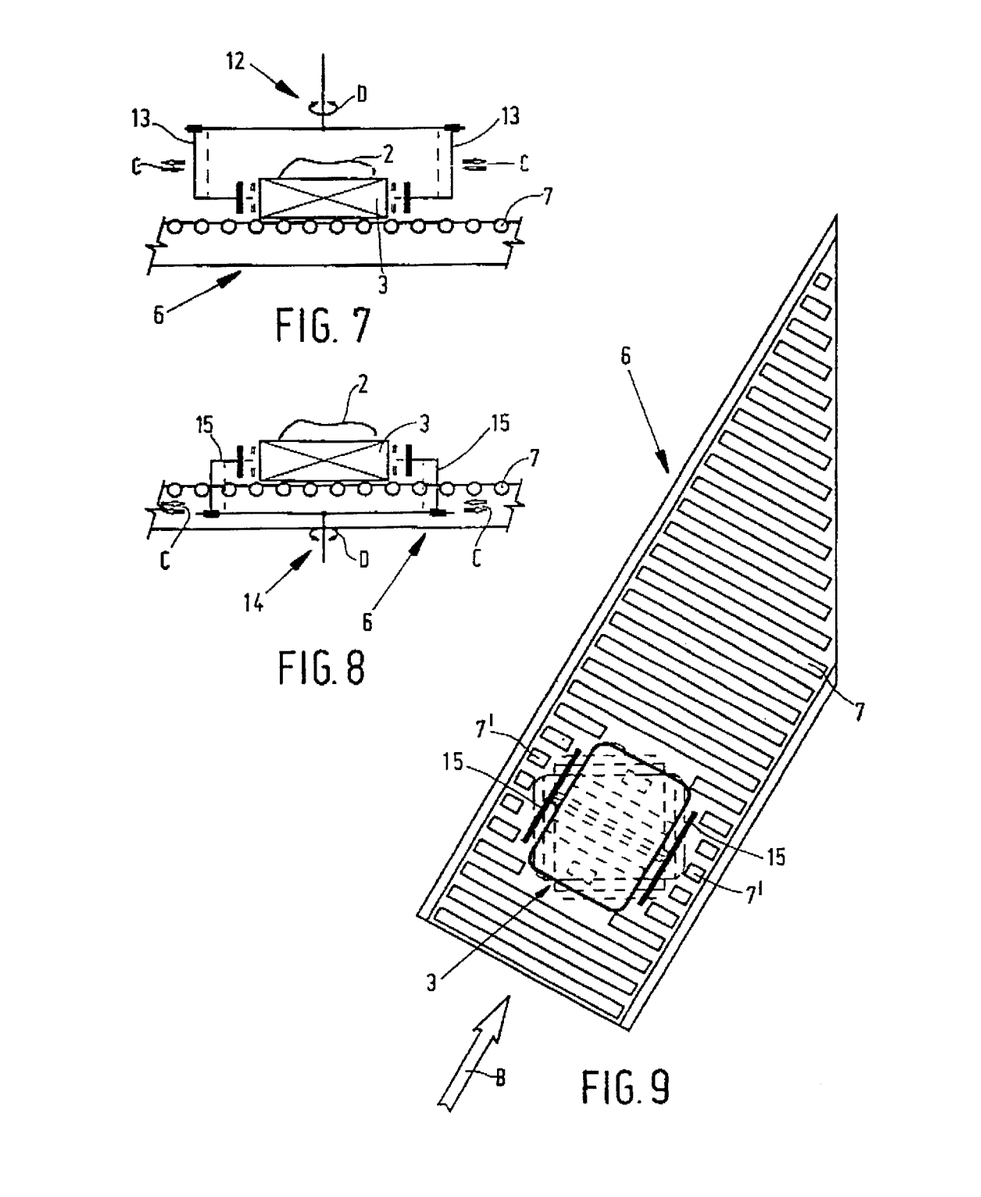

As is schematically shown in FIG. 7, it is also possible to use a gripping device 12 disposed above the rollers 7 of the supply conveyor for turning the tray 3 to the desired position, which gripping device includes clamping arms 13, which can be moved to and fro as indicated by arrows C for engaging the sides of tray 3 with a view to clamping tray 3 between them, after which tray 3 can be slightly lifted by the gripping device 12, if desired, and subsequently be turned about an upwardly extending axis of rotation, as indicated by arrow D.

It will also be conceivable, however, to turn the tray while it remains in contact with the rollers.

Instead of using sliding clamping arms it is also possible to use pivoted clamping arms. The clamping arms 13 can be moved out of the path of movement of the trays on supply conveyor 6 by moving or pivoting the arms apart and/or by raising the entire gripping device 12.

As is shown in FIGS. 8 and 9, it is also possible to dispose such a gripping device 14 under the rollers 7 of the supply conveyor, wherein the gripping device 14 can be moved up and down, for example, between a position in which the upper ends of gripping arms 15 are positioned under the uppermost points of rollers 7, 7', and a position in which the upper ends of the gripping arms 15 project above rollers 7, 7'. When this device is used, the gripping device 14 can be moved further upwards a little after the gripping arms 15 have clamped tray 3 between them, after which tray 3 is turned through the desired angle. Following that, the gripping device 14 will move downwards again so as to place the tray onto rollers 7, 7', and release the tray by moving or pivoting the gripping arms 15 apart. It is also possible, however, to turn tray 3 whilst it is supported on rollers 7, 7'. When the gripping arms 15 can be moved out of the path of movement of the trays on the supply conveyor by moving them apart, the arms need not be retractable in downward direction.

The gripping devices 12 and 14 that are shown in FIGS. 7 and 8, respectively, may be fitted with two gripping arms 13 and 15, respectively, which engage two opposed ends of tray 3, or with four gripping arms, which engage tray 3 on all four sides.

Figure 10:
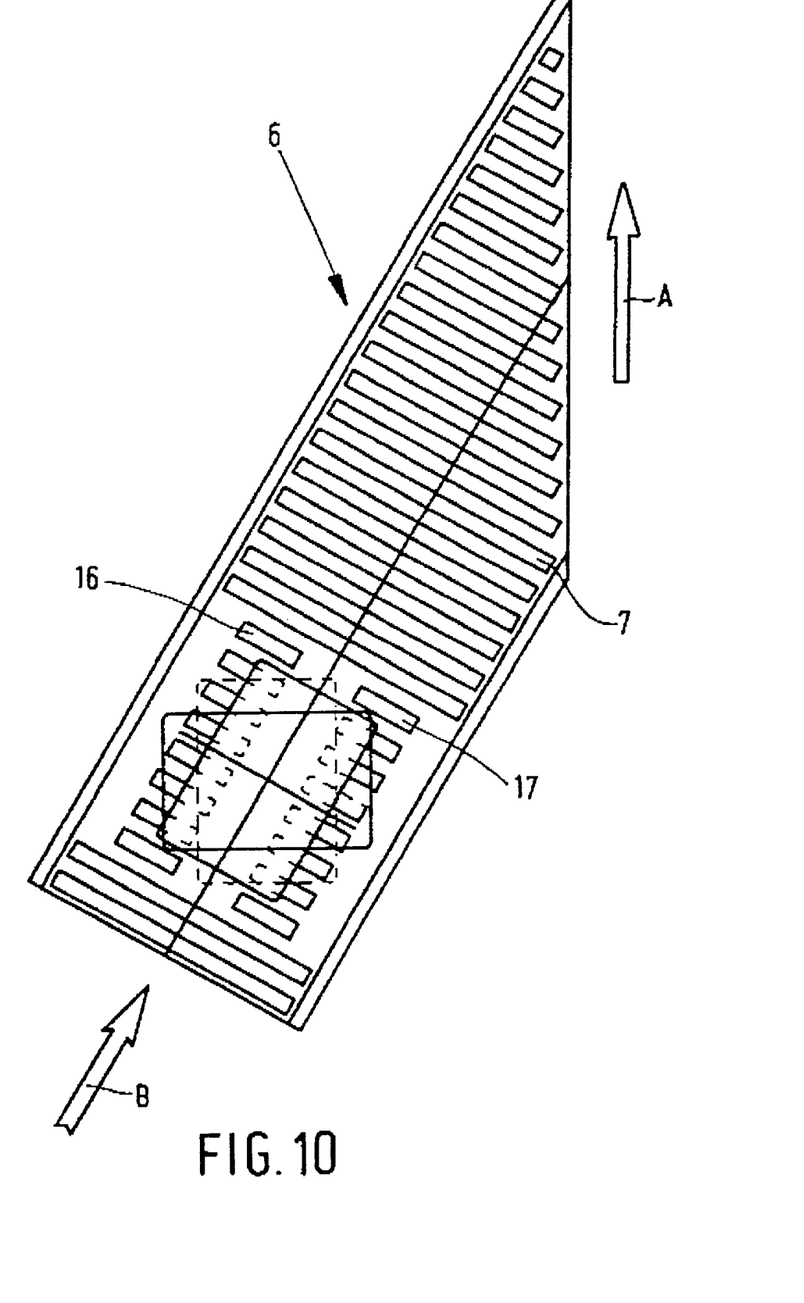

The supply conveyor 6 that is schematically shown in FIG. 10 includes two rows of rollers or wheels 16 and 17 resp., which extend in the longitudinal direction of the supply conveyor 6, said rollers or wheels being rotatable about axes of rotation extending parallel to the axes of rotation of rollers 7. When a tray 3 is transported in the longitudinal direction of the supply conveyor 6 and no change in the position of the tray 3 is required, rollers 16 and 17 will all be driven in the same direction as rollers 7. When a change in the position of tray 3 is necessary, however, the rollers of one row can be driven in a direction opposed to the direction in which the rollers of the other row are driven so as to turn the tray when tray 3 is positioned above the rollers 16 and 17, as is schematically illustrated in dotted lines for a tray 3. When tray 3 is to be turned in clockwise direction, seen in FIG. 10, wheels 16 will be driven in the usual direction and wheels 17 will be driven in the opposite direction. When tray 3 is to be turned in anticlockwise direction, seen in FIG. 10, wheels 17 will be driven in the usual direction and wheels 16 will be driven in the opposite direction.

After tray 3 has thus been turned to the desired position about an imaginary upwardly extending axis of rotation, the rollers or wheels 16 and 17 and the rollers 7 will all be driven in the same direction again for moving the tray 3 in the longitudinal direction of the supply conveyor 6.

Figures 11, 12:
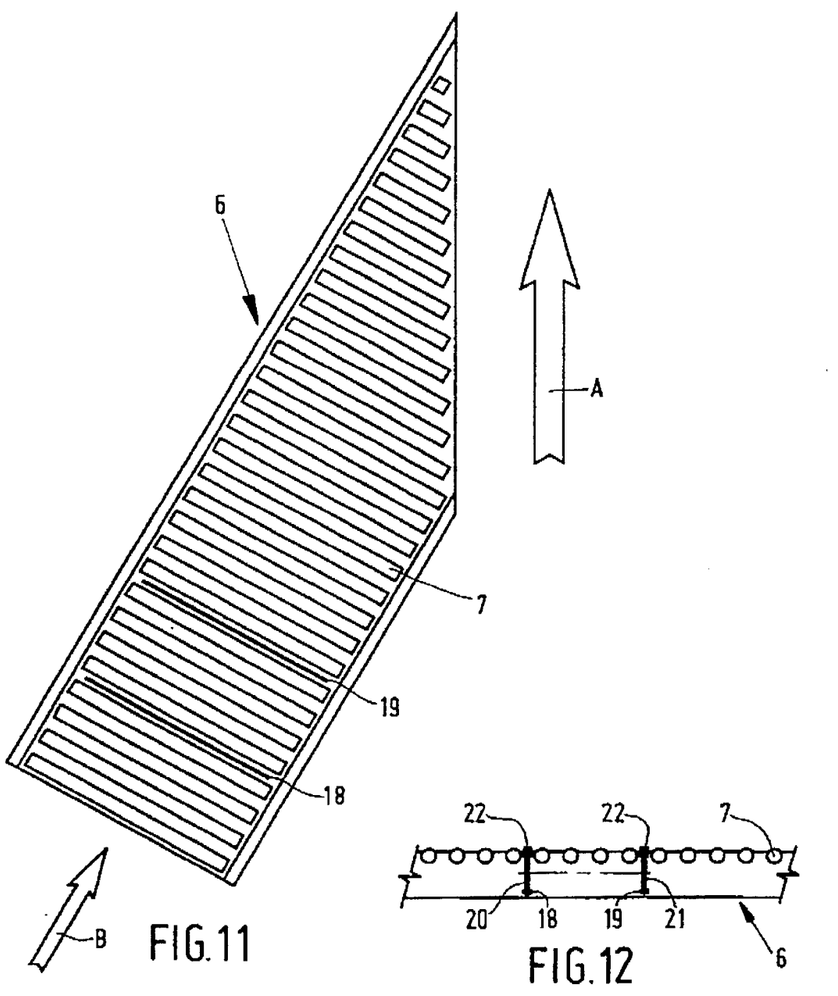
Figure 13:
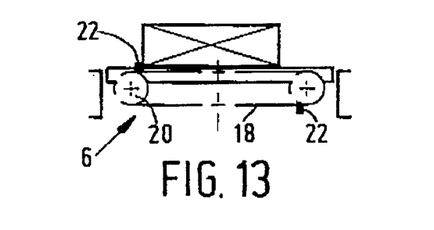

In the embodiment according to FIGS. 11–13 two spaced-apart belts or chains 18 and 19 are disposed between the rollers 7 of the supply conveyor 6, which belts or chains are passed over two chain wheels 20 and 21, respectively, whose axes of rotation cross the axes of rotation of rollers 7 perpendicularly, as will be apparent from FIG. 12.

Chains 18 and 19 are fitted with carrier elements 22, which can be positioned between rollers 7 by moving the chains, whereby said carrier elements project above the rollers 7, as is shown in FIG. 13.

Once a tray 3 has been brought to a standstill above chains 18, 19, said chains 18, 19 can be driven in opposite directions, so that the carrier elements 22 that project above the rollers will engage the tray 3 on opposite sides, thus turning the tray to a desired position with respect to rollers 7 supporting tray 3, wherein the tray will be turned in clockwise or anti-clockwise direction, depending on the direction of movement of the two chains.

Then the chains can be driven in reverse direction, so that carrier elements 22 are returned to a starting position, in which they do not interfere with the movement of trays 3 by means of supply conveyor 6.

Figure 14:
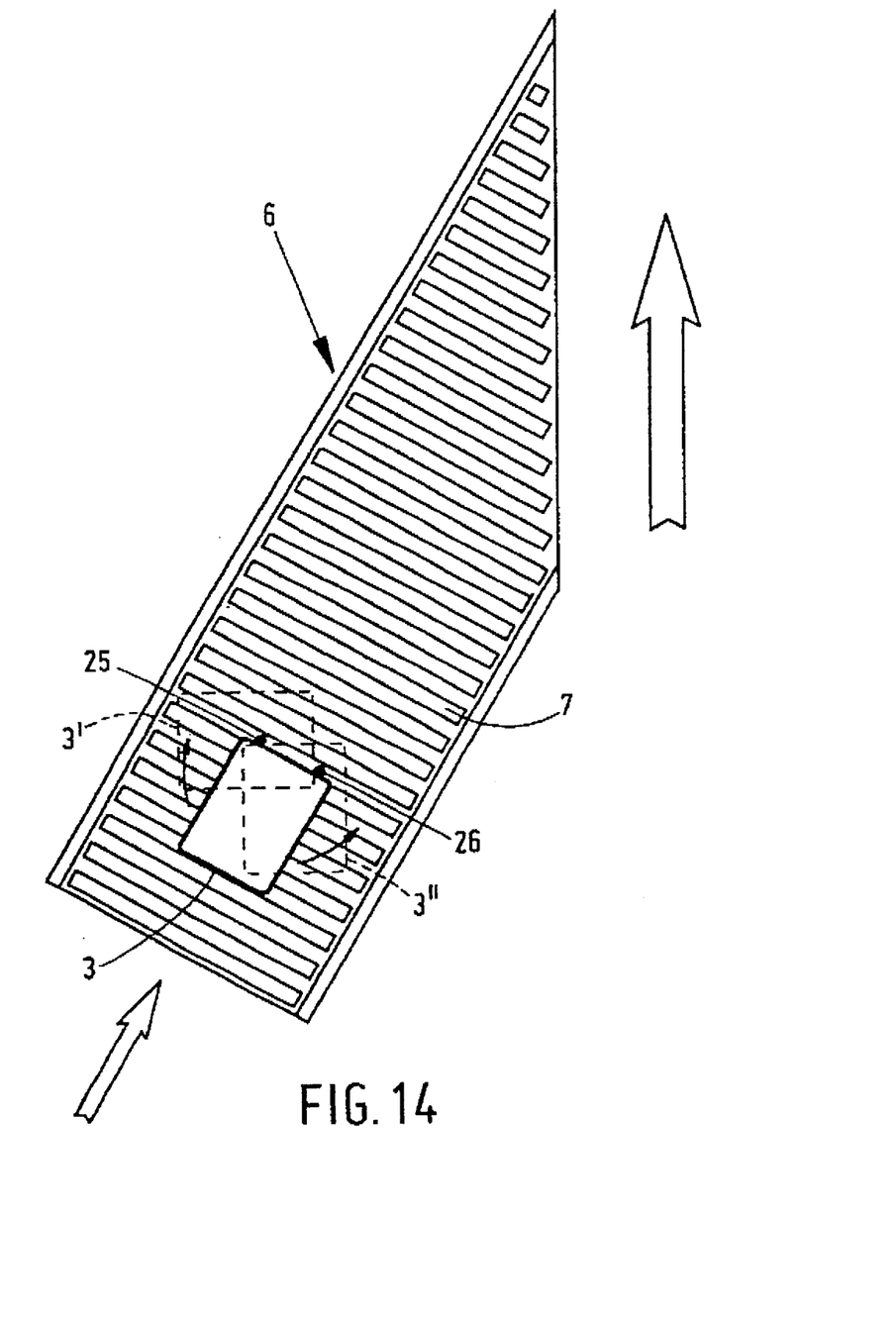

In the embodiment that is shown in FIG. 14 two stop members or pins 25 and 26, which can be moved up and down independently of each other, are disposed between two successive rollers 7 of the supply conveyor.

When a tray 3 is supplied in a position as illustrated in full lines in FIG. 14, and pin 26 is moved up to a position in which pin 26 projects above the rollers 7 of the supply conveyor, said pin 26 will engage the right-hand front end of the tray 3, seen in the direction of movement of tray 3, and stop said point of tray 3, as a result of which tray 3 is turned in clockwise direction under the influence of the rotating rollers 7 to the position 3' that is illustrated in dotted lines in FIG. 14. When stop 25 rather than stop 26 is raised above rollers 7, however, the left-hand front end of tray 3, seen in the direction of movement of tray 3, will come into contact with stop 25 and be stopped, as a result of which tray 3 will be turned in anti-clockwise direction to the position 3' that is illustrated in dotted lines.

It will be understood that thus many solutions are conceivable for turning the tray 3 that is present on supply conveyor 6 about an upwardly extending axis of rotation until tray 3 takes up a position suitable for being placed onto carrier 1 in the desired position. Furthermore the supply conveyor 6 may include conveyor belts or the like instead of rollers 7, 7' for moving the trays.

Figure 15:
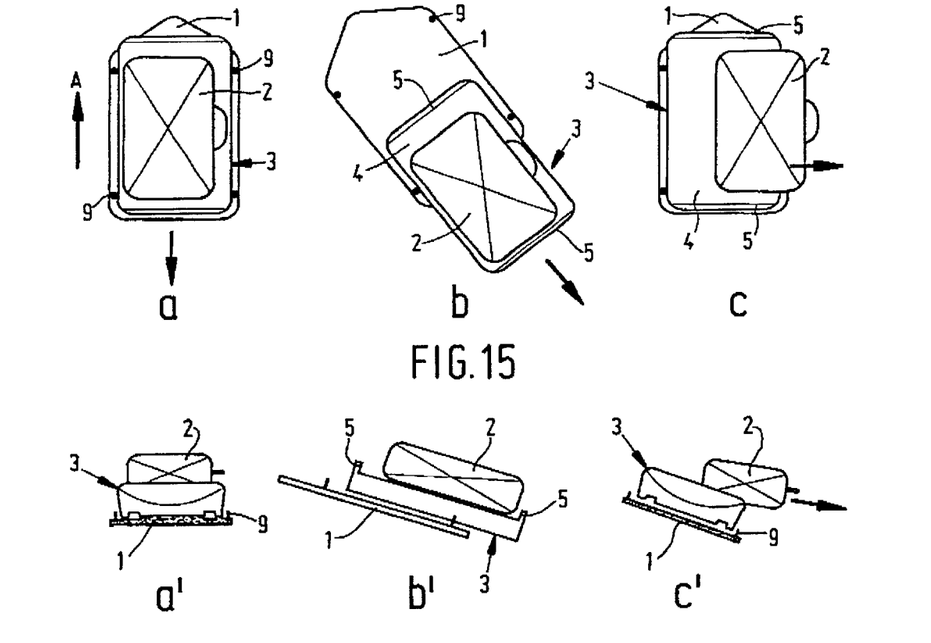
FIGS. 15 and 16 schematically show embodiments of a device wherein a carrier can be moved to a position in which one end of the carrier is positioned higher than the other end.

FIG. 15 schematically shows an embodiment wherein a carrier 1 as shown in FIG. 15a can be pivoted about the usual pivot axis extending in the intended direction of movement of carrier 1 as indicated by arrow A for removing an object 2 from a tray 3 that is present on carrier 1, as is schematically shown in FIG. 15C. In this embodiment, however, carrier 1 can also be pivoted with respect to the trolley supporting said carrier, about an upwardly extending pivot axis (not shown) that includes an angle deviating from 90° with the vertical in the situation wherein the trolley supporting said carrier is moved parallel to a horizontal plane.

Upon pivoting of the carrier about such a pivot axis including an angle with the vertical, carrier 1 will tilt in such a manner that one end of the carrier 1 will be positioned higher than the other end of carrier 1. In this position of the carrier the tray 3 can slide off the carrier 1 together with the object 2 in a position in which an upright end wall 5 or the like stop member prevents the object from sliding off the tray, as is shown in FIG. 15b.

Figure 16:
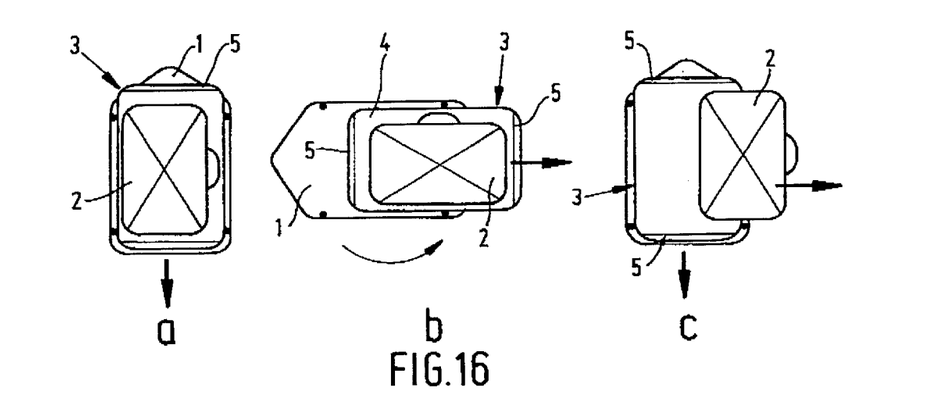

FIG. 16 schematically shows an embodiment wherein the carrier 1 is rotatably connected about an upwardly extending axis of rotation (not shown) to a frame member supporting said carrier 1, which frame member is pivotable about the pivot axis with respect to the trolley supporting said carrier.

As is shown in FIGS. 16c and 16c', an object 2 and/or an empty tray 3 can be removed from the tray or from the carrier 1, respectively, in the usual manner by pivoting the carrier 1 about the pivot axis extending in the intended direction of movement of the carrier.

It is also possible, however, to move the carrier to a position in which it is turned through an angle of for example 90° in relation to the usual position of the carrier, and subsequently pivot the carrier in the manner shown in FIGS. 16b and 16b', so that also in this case a possibility has been created to remove tray 3 from the carrier in either one of two positions turned through an angle of for example 90° in relation to one another.

What is claimed is:

1. A method for operating a device for conveying objects from a supply station to a delivery station, wherein a conveyor is used by means of which trays containing loose objects can be moved, wherein said conveyor includes at least one carrier for receiving said trays, which carrier can be moved in an intended direction of movement with the aid of driving means, characterized in that the object is removable from the tray by repositioning the carrier, wherein at least one of the tray and the carrier is provided with means for engaging the other of the tray and the carrier such that the object slides off the tray when the tray is positioned in a first direction and the means for engaging are engaged, and the tray and the object are jointly removed from the carrier when the tray is positioned in a second direction and the means for engaging are disengaged.

2. A method according to claim 1, characterized in that the carrier is pivoted about an upwardly extending axis of rotation for removing the tray containing the object from the carrier.

3. A method according to claim 2, characterized in that the carrier is pivoted about an upwardly extending axis of rotation, which includes an angle with the vertical in a position in which the carrier is moved parallel to a horizontal plane, in such a manner that when the carrier takes up a position in which it has been pivoted about the axis of rotation, one end of said carrier will be positioned lower than the other end of the carrier.

4. A method according to claim 2, characterized in that after the carrier has been pivoted about said vertically extending axis of rotation, said carrier and said axis of rotation are pivoted about the pivot axis.

5. A method according to any one of the preceding claims, characterized in that the tray is either supplied to the carrier in a first position, if it is intended to remove the tray from the carrier together with the object by pivoting the carrier about the pivot axis, or in a second position, in which it is turned in relation to said first position, if it is intended to remove only the object from the carrier at a specific location by pivoting the carrier about the pivot axis.

6. A device for conveying products from a supply station to a delivery station, which device includes a conveyor by means of which trays containing objects can be moved, wherein said conveyor includes at least one carrier for receiving trays containing loose objects, which carrier can be moved in an intended direction of movement with the aid of driving means and which can be selectively pivoted about a pivot axis at least one desired location, the device including a supply conveyor, which is fitted with means for delivering the tray to the carrier in one of two positions, and the device including means for engaging provided on one of the tray and the carrier, the means for engaging adapted to engage the other one of the tray and the carrier when the tray is positioned in a first position such that the object slides off the tray and adapted to disengage from the other one of the tray and the carrier when the tray is positioned in a second position such that the object slides off the tray.

7. A device according to claim 6, characterized in that said supply conveyor comprises an adjusting element which is capable of up-and-down movement and which is rotatable about an upwardly extending axis of rotation, which adjusting element can engage the tray so as to turn the tray through a desired angle.

8. A device according to claim 7, characterized in that said adjusting element is a cross-shaped member, which can be reciprocated between at least two positions.

9. A device according to claim 7, characterized in that adjusting element is a turntable, which is rotatable in one direction.

10. A device according to claim 7, characterized in that said adjusting element includes reciprocatingly movable gripping members for engaging the tray to be turned.

11. A device according to claim 7, characterized in that said adjusting element includes drivable wheels, which are arranged in such a manner that a tray supported on said wheels will be turned when the wheels are driven.

12. A device according to claim 6, characterized in that said supply conveyor includes two rows of rollers disposed one behind another, which rows are arranged beside one another, seen in the intended direction of movement of the tray, wherein said rollers of each row can be selectively rotated in one direction or in the other.

13. A device according to claim 6, characterized in that said supply conveyor includes two spaced-apart belts or chains extending transversely to the intended direction of movement of a tray, which can be driven in opposed directions and which include carrier elements that are capable of engaging a tray.

14. A device according to claim 6, characterized in that said supply conveyor includes two stop members which can move up and down independently of each other, which stop members can be selectively placed in the path of a tray moved by the supply conveyor.

15. A method for conveying an object from a supply station to a delivery station, comprising the steps of:

moving a tray containing at least one loose object in a conveying direction on a conveyor;

repositioning a carrier which receives the tray from the conveyor; and providing at least one of the carrier and the tray with a means for engaging the other one of the tray and the carrier such that only the at least one loose object is removed from the carrier when the tray is positioned in a first orientation and the means for engaging is engaged, and such that both the at least one loose object and the tray are removed from the carrier when the tray is positioned in a second orientation and the means for engaging is disengaged.

\* \* \* \* \*